US010763098B2

(12) United States Patent
Jiang et al.

(10) Patent No.: US 10,763,098 B2
(45) Date of Patent: Sep. 1, 2020

(54) ION OPTICAL DEVICE WITH ORTHOGONAL ION BARRIERS

(71) Applicant: SHIMADZU CORPORATION, Kyoto (JP)

(72) Inventors: Gongyu Jiang, Shanghai (CN); Wenjian Sun, Shanghai (CN); Yupeng Cheng, Shanghai (CN); Xiaoqiang Zhang, Shanghai (CN)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 16/088,553

(22) PCT Filed: Mar. 30, 2017

(86) PCT No.: PCT/JP2017/013345
§ 371 (c)(1),
(2) Date: Sep. 26, 2018

(87) PCT Pub. No.: WO2017/187880
PCT Pub. Date: Nov. 2, 2017

(65) Prior Publication Data

US 2019/0080895 A1 Mar. 14, 2019

(30) Foreign Application Priority Data

Apr. 25, 2016 (CN) .......................... 2016 1 0260015

(51) Int. Cl.
*H01J 49/42* (2006.01)
*G01N 27/62* (2006.01)
(Continued)

(52) U.S. Cl.
CPC .......... *H01J 49/429* (2013.01); *G01N 27/622* (2013.01); *H01J 49/0027* (2013.01);
(Continued)

(58) Field of Classification Search
CPC .... H01J 49/429; H01J 49/0027; H01J 49/403; H01J 49/4225; H01J 49/422; H01J 49/06; H01J 49/062; G01N 27/622
See application file for complete search history.

(56) References Cited

U.S. PATENT DOCUMENTS 7,208,728 B2 4/2007 Hashimoto et al.
7,323,683 B2 1/2008 Krutchinsky et al.
(Continued)

FOREIGN PATENT DOCUMENTS

CN 101305444 A 11/2008
CN 101868843 A 10/2010
(Continued)

OTHER PUBLICATIONS

JPO, "Japanese Office Action for JP Application No. 2018-550606", Japan, dated Jul. 1, 2019.
(Continued)

*Primary Examiner* — Brooke Purinton
(74) *Attorney, Agent, or Firm* — Tim Tingkang Xia, Esq.; Locke Lord LLP

(57) ABSTRACT

An ion optical device includes one or more pairs of confinement electrode units arranged at two sides of a first direction; a power supply device for applying opposite radio-frequency voltages to the paired confinement electrode units respectively and forming thereon DC potentials distributed in a second direction orthogonal to the first direction to form a potential barrier herein over a length portion of the first direction; one first area and one second area positioned at two sides of the potential barrier in the second direction; and a control device connected with the power supply device for controlling an output thereof to change the potential barrier to manipulate the ions transported/stored in the first area being transferred to the second area through the potential barrier in ways based on the mass
(Continued)

to charge ratio or mobility of the ions and continue being transported along the first direction.

14 Claims, 5 Drawing Sheets

(51) Int. Cl.
*H01J 49/00* (2006.01)
*H01J 49/40* (2006.01)

(52) U.S. Cl.
CPC .......... *H01J 49/403* (2013.01); *H01J 49/422* (2013.01); *H01J 49/4225* (2013.01)

(56) References Cited

U.S. PATENT DOCUMENTS

| | | | | |
|---|---|---|---|---|
| 7,582,864 | B2 | 9/2009 | Verentchikov | |
| 7,838,826 | B1 * | 11/2010 | Park | G01N 27/622 250/281 |
| 8,227,151 | B2 | 7/2012 | Inanami et al. | |
| 8,299,443 | B1 | 10/2012 | Shvartsburg et al. | |
| 8,487,248 | B2 | 7/2013 | Green | |
| 8,598,516 | B2 * | 12/2013 | Sapargaliyev | H01J 49/408 250/282 |
| 8,637,816 | B1 | 1/2014 | Mordehai | |
| 8,754,367 | B2 | 6/2014 | Kou | |
| 9,177,776 | B2 | 11/2015 | Hoyes et al. | |
| 9,184,039 | B2 | 11/2015 | Pringle et al. | |
| 2005/0127290 | A1 | 6/2005 | Hashimoto et al. | |
| 2008/0048113 | A1 | 2/2008 | Franzen et al. | |
| 2012/0256083 | A1 | 10/2012 | Kovtoun | |
| 2014/0299761 | A1 | 10/2014 | Giles et al. | |
| 2014/0299766 | A1 | 10/2014 | Anderson et al. | |
| 2015/0235832 | A1 | 8/2015 | Giles | |
| 2016/0071716 | A1 | 3/2016 | Brown et al. | |

FOREIGN PATENT DOCUMENTS

| | | | |
|---|---|---|---|
| DE | 10 2006 040 000 | A1 | 3/2008 |
| JP | P2010-541125 | A | 12/2010 |
| WO | 2009037483 | A2 | 3/2009 |

OTHER PUBLICATIONS

SIPO, "Chinese Office Action for CN Application No. J2016102600150", China, dated Jun. 26, 2018.
European Patent Office (ISR/EP), "International Search Report for PCT/JP2017/013345", NL, dated Jun. 28, 2017.
German Patent and Trademark Office, "German Office Action for DE Application No. 11 2017 002 161.8", Germany, dated Dec. 4, 2019.

* cited by examiner

ION OPTICAL DEVICE WITH ORTHOGONAL ION BARRIERS

TECHNICAL FIELD

The present invention relates to the technical field of mass analysis, and more specifically to an ion optical device.

BACKGROUND

For a mass analyzer operating under a scanning mode (such as a quadrupole) or under a pulse mode (such as time of flight, an electrostatic ion trap, etc.), when a flow of ions having a wide mass to charge ratio range is analyzed, ions outside a specific range of mass to charge ratios may be subjected to strength discrimination or cannot be used due to the inconsistency between the mass to charge ratio range of ions that can be analyzed instantaneously by the mass analyzer and that of the flow of ions, which may greatly affect the sensitivity and mass discrimination of mass spectrometers using these mass analyzers, such as a triple quadrupole, a tandem quadrupole-time of flight mass spectrometer or an electrostatic Orbitrap mass spectrometer. The traditional way to solve this problem includes:

A. Using an ion storage device to store the ions and discharging the ions synchronously according to the requirements of a mass analyzer of a subsequent stage.

B. Adding a mass-selective pseudo potential barrier or a fringe field structure at an end part of an ion guide, or modulating the ion ejection in conjunction with mass-selective resonances.

C. Using an additional ion guide or storage structure to temporarily store ions of a preceding stage in the time of flight analyzer, etc., and carrying out ion release and analysis according to its operating time sequence.

D. Using additional acceleration and deceleration lenses to ensure that the ions are sequentially synchronous with a time sequence of the following-stage mass analyzer at a controlled time.

However, the above methods has limitations:

As for A, a linear ion trap described in U.S. Pat. Nos. 7,208,728, 7,323,683 and a so-called Scanwave™ technology described in U.S. Pat. No. 9,184,039 are taken as an example. In such a mode, the ions are directly constrained by a DC potential produced by a plurality of axially arranged electrodes or by a radio-frequency pseudo potential. In addition, in this mode, axial transport control and mass-selective ejection of the ions are controlled by the same potential barrier formed axially, and the ion ejection and mass separation occur in the same direction. Since any ion storage device has a certain storage limit, the potential barrier has non-linear responses to mass selection when the ion flow exceeds the limit. Besides, the storage device itself may cause trailing, post-heating of the released ions due to the presence of a gas pressure or bound radio-frequency, and there are restrains on the extra high vacuum of a high-resolution mass analyzer, such that a certain transition distance generally exists between the analyzer and the ion storage device. Even though the released ions are synchronous with the time sequence of the following-stage mass analyzer, the mass discrimination occurs again due to different speeds of ions of different mass to charge ratios after the transition distance has been traveled.

B. Taken as an example is a secondary quadrupole DC potential well established in a length direction of an ion optical device through a multi-discrete electrode structure as described in U.S. Pat. Nos. 8,227,151, 8,487,248, etc., or a pseudo potential barrier featuring mass separation which is formed by using multiple spatial radio-frequency potential waveforms of different wavelengths through introducing an axial periodic electrode structure as described in U.S. Pat. Nos. 8,299,443, 9,177,776. In these methods, the mass separation potential barrier is axially positioned with respect to the ion transfer, and its fringe field structure itself may damage cooling and mass characteristics of the ions in a field axis. For quick ejection of the ions, an axial resonance excitation means that is introduced may enable greater energy distribution of the ions in an ejection direction, which may destroy resolution characteristics of high-resolution analyzers such as the quadrupole, time of flight and electrostatic ion trap analyzers, due to the deterioration of initial phase space distribution.

C. U.S. Pat. No. 7,582,864 is taken as a representative, in which an on-axis radio-frequency potential is achieved by using a two-phase amplitude-asymmetric radio frequency, and by combining the radio-frequency potential with a multipole field of electrodes induced by an end DC, ions are ejected in an order from large to small in terms of axial mass to charge ratio. However, such a guide or storage structure itself easily damages the perfection of the field of the analyzer due to the axial non-zero radio-frequency potential, thereby adding to the complexity of conditions required for subsequent ion focusing. Furthermore, asymmetric radio-frequency waveforms required by the guide or the storage structure may cause deterioration of the energy and spatial distribution of the ions upon release of the ions.

D. U.S. Pat. No. 8,754,367 is taken as a representative, in which a time-varying electric field is used firstly to separate ions of different mass to charge ratios, then its spatial position is used for constructing a non-linear electric field acceleration so as to allow the ions to finally enter an acceleration area of the time of flight at the same time. Although the ions may be well focused axially by this means, the axial non-linear electric field is inevitably accompanied by a huge non-linear divergent electric field radially according to the Laplace equation for electric field distribution. According to Liouville theorem, the temporal distribution of ions is compressed by this method, but sacrifices of radial space and energy focusing characteristics are inevitable, which is extraordinarily disadvantageous to high-resolution quadrupole, time of flight and electrostatic ion trap analyzers.

SUMMARY

In view of the drawbacks in the above existing technologies, the present invention aims to develop an ion optical device capable of axial transport (i.e., in a first direction). By manipulating the position, height or gradient direction of a potential barrier in a radial direction (i.e., a second direction), ions are introduced and transported to a first area at one side of the potential barrier. By changing the position, height or gradient direction of the potential barrier, the ions transported or stored in the first area may be transferred to a second area for storage or transport according to the mass to charge ratio or mobility of the ions. Thus, a mode of modulating a time sequence of the mass spectrometry or mobility spectrometry of the ions ejected from the ion optical device along an axial direction is finally achieved, thereby improving the ion utilization efficacy of other downstream devices operating synchronously therewith, especially a time of flight or electrostatic trap detector operating in the pulse mode. For a quadrupole mass analyzer, since a time for ion feeding may also be synchronized with a mass analysis channel of the quadrupole after modulation, the overall efficacy for sensitivity analysis may also be improved when such a mass analyzer operates in a scanning mode.

In order to achieve the foregoing and other related objects, the present invention provides an ion optical device, comprising: one or more pairs of confinement electrode units arranged opposite to each other at two sides of the first direction in a space and extending along the first direction; an ion inlet positioned upstream of the first direction for introducing ions along the first direction; a power supply device for applying opposite radio-frequency voltages to the pairs of confinement electrode units respectively and forming on the confinement electrode units a plurality of DC potentials which are distributed in a second direction substantially orthogonal to the first direction so as to form a potential barrier in the second direction over at least a portion of the length of the first direction; at least one first area and at least one second area positioned in the space at two sides of the potential barrier in the second direction; and a control device connected with the power supply device for controlling an output of the power supply device to change the potential barrier so as to manipulate the transfer of the ions transported or stored in the first area to the second area through the potential barrier in different ways based on the mass to charge ratio or mobility of the ions. Since the control and transport of the ions occur in the first direction while the distinguishment and separation in the second direction, the electric fields required by them are orthogonalized, and thus the contradictory problem of axial cooled transport and axial mass separation discussed in the background is avoided.

In an embodiment of the present invention, the control device is used for manipulating an output amplitude or frequency of the power supply device to adjust the position, height or direction of the potential barrier.

In an embodiment of the present invention, ions in the second area are to be ejected from the ion optical device along the first direction.

In an embodiment of the present invention, the ion optical device comprises an extraction electrode unit arranged downstream of the second area and connected with an outlet of the ion optical device for ejecting the ions in the second area out of the ion optical device along the first direction.

In an embodiment of the present invention, a periodic pulse voltage used for effecting ejection of the ions is applied to the extraction electrode unit.

In an embodiment of the present invention, a following stage of the ion optical device is provided with a mass analyzer to which the control device is connected. The control device is used to control the power supply device and the mass analyzer to match the mass to charge ratio or mobility of the ions transferred to the second area for ejection with an ion mass needing analysis that is set by the control device for the mass analyzer.

In an embodiment of the present invention, each confinement electrode unit comprises a plurality of electrodes arranged along the second direction. Radio-frequency voltages of opposite phases and DC voltages are applied to adjacent electrodes. The electrodes of two paired confinement electrode units form one-to-one pairs, and radio-frequency voltages of opposite phases are applied to two paired electrodes, respectively.

In an embodiment of the present invention, the electrodes of each confinement electrode unit are spaced apart in parallel.

In an embodiment of the present invention, each confinement electrode unit comprises more than 3 electrodes.

In an embodiment of the present invention, there is a collision gas in the space.

In an embodiment of the present invention, the collision gas has a pressure ranging from 0.1 to 10 Pa.

In an embodiment of the present invention, an opening angle greater than 0 but less than 50 degrees is formed between the paired confinement electrode units for introducing a DC penetration field in the first direction and for compressing and transporting ions downstream in the first direction.

In an embodiment of the present invention, an opening angle greater than 0 but less than or equal to 20 degrees is formed between the paired confinement electrode units.

In an embodiment of the present invention, a ratio of opening distances between the paired confinement electrode units at two ends in the first direction is 1 to 2.8.

In an embodiment of the present invention, a ratio of opening distances between the paired confinement electrode units at two ends in the first direction is 1.9 to 2.4.

As described above, the ion optical device of the present invention comprises one or more pairs of confinement electrode units arranged opposite to each other at two sides of the first direction in a space and extending along the first direction; a power supply device for applying opposite radio-frequency voltages to the pairs of confinement electrode units respectively and forming on the confinement electrode units a plurality of DC potentials which are distributed in a second direction substantially orthogonal to the first direction so as to form a potential barrier in the second direction over at least a portion of the length of the first direction; at least one first area and one second area positioned in the space at two sides of the potential barrier in the second direction; and a control device connected with the power supply device for controlling the output of the power supply device to change the potential barrier so as to manipulate the transfer of the ions transported or stored in the first area to the second area through the potential barrier in different ways based on the mass to charge ratio or mobility of the ions, thereby improving the ion utilization efficacy of other downstream devices operating synchronously therewith.

DETAILED DESCRIPTION

Embodiments of the present invention are described below through specific examples. Those skilled in the art may easily learn other advantages and functions of the present invention from the content disclosed in the specification. The present invention also may be implemented or applied through other different embodiments, and what details described in the present invention may be modified or changed based on different views and applications without departing from the spirit of the present invention. It should be noted that, in case of no conflict, embodiments of this application and features of the embodiments may be combined with each other.

Figure 1A:
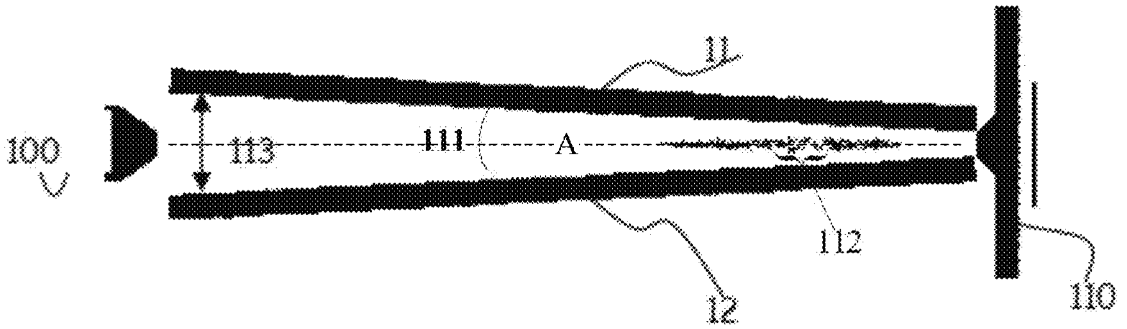
FIGS. 1*a* and 1*b* show a schematic structural diagram of an ion optical device according to one embodiment of the present invention.
Figure 1B:
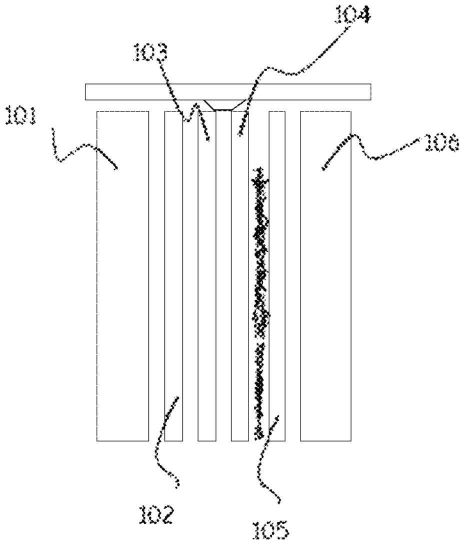

FIGS. 1*a* and 1*b* show an embodiment of an ion optical device according to the present invention. As shown in FIG. 1, the ion optical device has an internal space within which there is a first direction (as shown in line A). The first direction is used as an ion transfer direction (referred to as an axial direction below) as it connects an inlet with an outlet of the ion optical device. One or more pairs of confinement electrode units 11 and 12 are arranged at two sides of the axial direction respectively in an up and down direction. The paired confinement electrode units 11 and 12 have opposite radio-frequency voltages, and a plurality of DC potentials provided along a second direction (referred to as radical direction below which run in the direction perpendicular to the paper, as shown in FIG. 1*a*) orthogonal to the first direction may be applied to the confinement electrode units 11 and 12. Of course, the formation of the plurality of DC potentials may be realized by for example phase separation and a structure of a plurality of electrodes applying respective DC voltages, but the present invention is not limited thereto.

Figure 1C:
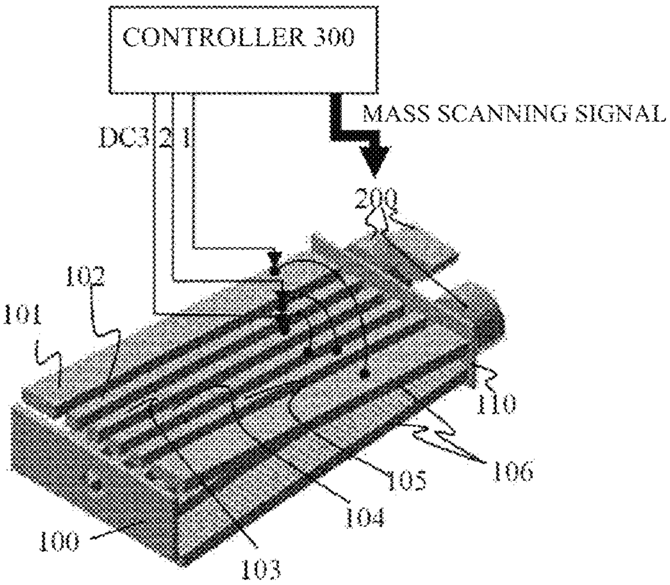
FIG. 1*c* shows a three-dimensional structure of the ion optical device and a quadrupole in tandem.

In particular, as shown in FIG. 1*b*, each confinement electrode unit comprises a plurality of electrodes (101-106) which may be spaced apart in parallel. The electrodes (101-106) have a straight band shape and extend in the axial direction, that is, from adjacent an inlet end to adjacent an outlet end of the ion optical device. In this embodiment, radio-frequency voltages of opposite phases are additionally applied between adjacently distributed electrodes in each confinement electrode unit 11 or 12, while the electrodes between the two confinement electrode units 11 and 12 also form one-to-one pairs. For example, the confinement electrode unit 11 is shown to have 6 electrodes, so that the confinement electrode unit 12 paired therewith has 6 electrodes as well. The radio-frequency voltages additionally applied between each pair of electrodes are opposite in phase, such that the ions introduced through the inlet 100 in the axial direction are constrained by the radio-frequency voltages and confined in the space between the confinement electrode units 11 and 12. Of course it should be noted that the number of electrodes shown is only a preferable example, and the present invention is not limited thereto. Tests have shown that the number of electrodes of each confinement electrode unit is preferably more than 3. The outlet of the ion optical device is provided with an extraction electrode 110 for extracting the ions out of the device. A mass analyzer may be serially connected downstream of the ion optical device. As shown in FIG. 1*c*, a quadrupole mass analyzer 200 (hereinafter referred to as quadrupole) may be serially connected behind the ion optical device to perform further mass analysis or selection of the ions ejected.

Figures 2A, 2B, 2C, 2D, 2E, 2F:
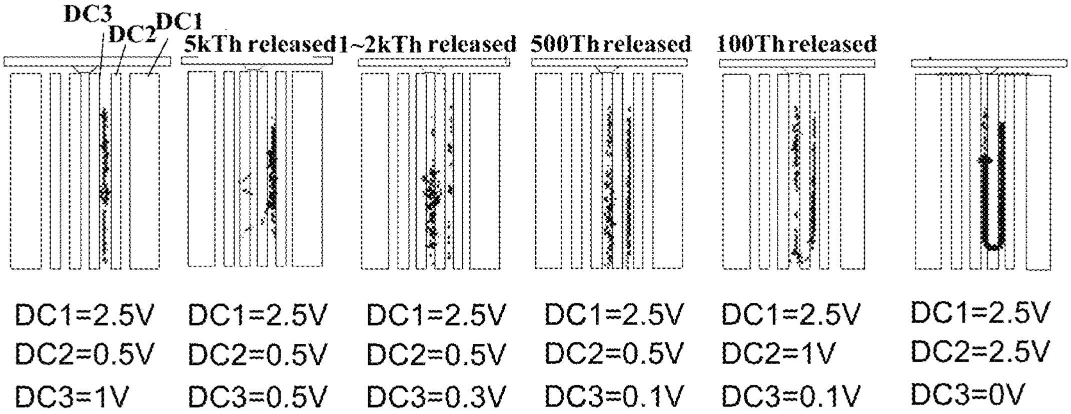
FIGS. 2*a* to 2*f* show a schematic diagram of a principle applied by the ion optical device according to one embodiment of the present invention.

Reference may be made to FIGS. 2*a* to 2*f* when the ion optical device of the present invention is used to manipulate an ion flow introduced continuously or quasi-continuously. For example, referring firstly to FIG. 2*a*, a DC potential DC2 of electrodes 102, 105 is reduced to lower than potentials DC1 and DC3 at two sides so as to realize a space potential barrier being in a W-like shape and extending radially at two sides of the axial direction. Here, areas located at two sides of the potential barrier in the radical direction are defined to be a first area (including for example a space between 104 and 105 or between 102 and 103), and a second area (including for example a space between 103 and 104). Ions introduced into the ion optical device through the inlet will be active in the first area out of the potential barrier. When a proper collision pressure (for example 0.1-10 Pa) is introduced, the introduced ion flow may be cooled gradually during a collision with a collision gas, and thus be constrained within the first area confined at two sides of the W-shaped radial potential barrier. Since the ion optical device features a long space in the axial direction, the ions may disperse to multiple positions in a length direction, leading to a reduced space charge density, thus the ion optical device allows a high upper storage limit to the introduced ions and forms a linear ion cloud containing a variety of ions of different masses as shown in FIG. 2*a*.

When it is desired to separate ions of different mass to charge ratios, the DC potential DC1 of outermost electrodes 101 and 106 may be raised, while the DC potential DC3 of intermediate electrodes 103 and 104 may be stepped down gradually. At this time, the ions stored in the first area may begin to enter the intermediate second area proximal to the axial direction through the W-shaped potential barrier. When DC3 voltage drops to 0.5V, ions with a mass to charge ratio of 5000 Th may enter the second area, as shown in FIG. 2*b*. When DC3 voltage drops to 0.3V, ions with a mass to charge ratio of 1000 to 2000 Th may enter the second area, as shown in FIG. 2*c*. When DC3 voltage drops to 0.1V, ions with a mass to charge ratio not less than 500 Th may enter the second area, as shown in FIG. 2*d* Similarly, raising the DC2 voltage may also achieve an effect of eliminating the radial potential barrier. For example, as shown in FIG. 2*e*, when the DC2 voltage increases to 1V, ions with a mass to charge ratio of not less than 100 Th may all be ejected from the first area and enter the second area. In the second area, due to the effects of a linear constraining structure and a radio-frequency field, the ions are still compressed into a fine linear beam and extracted out of the device finally. When DC2 and DC1 have the same voltage, all ions enter a medial axis area of the device as there is no longer a potential barrier for distinguishing the first and second areas. FIG. 2*f* shows an overall route of ions having various mass to charge ratios during transfer which forms a U-shaped migration path. A time sequence for ion ejection is constrained by the changes of DC1, DC2 and DC3.

During this process, since pseudo potential barriers formed by the radio-frequency voltages are of different heights, ions of different mass to charge ratios enter the second area through the W-shaped potential barrier successively at different potential barrier intensities. Ions entering the second area will continue to be constrained by a quadrupolar field formed by the radio-frequency voltages of the electrodes 103 and 104 and are transported further forward. The finally formed overall effect is that the ions exit the ion optical device sequentially from large to small in terms of the mass to charge ratio through the extraction electrode 110.

One advantage of this device is that ions of different masses that are introduced from upstream may form an enrichment effect through a mass number according to a preset of a downstream mass analyzing and filtering device before being transported to the downstream mass analyzing and filtering device, so as to cooperate with a device incorporating a quadrupole mass analyzer, for example as shown in FIG. 1*c*. A controller 300 is used for simultaneously and synchronously outputting the potential barrier voltages DC1-DC3 of the ion optical device and a mass-scanning control voltage of the quadrupole mass analyzer 200. In modern instruments, the controller 300 may be a computer or a control card integrated in the computer, or an embedded system such as a single chip microcomputer, a digital signal processor (DSP) or a programmable gate array (PLD/FPGA), etc., which is formed by cooperating with a proper digital-to-analog conversion circuit and a conditioning circuit. In case of mass scan window from 15 Th to 715 Th, which is common in pesticide residue analysis, assuming that the pesticide and background impurity ions are uniformly dispersed in the 700 Th mass window, if the ion optical device is not additionally provided, only 1/700 of the ions can pass through the quadrupole instantaneously in a scanning mode to obtain a detector response, as the mass window analyzable for the quadrupole mass analyzer 200 in a standard mode is 1 Th. In contrast, if the ion optical device is additionally provided, each ion in this mass window may be ejected synchronously with a time sequence for quadrupole scanning by adjusting the voltages of DC1-DC3. At this time, 100% of the ions may be used, and a signal gain is 700. Even though considering that actual samples have different mass to charge ratio abundances, adopting the ion optical device of the present invention as a preceding-stage modulation device of the quadrupole may at least obtain a signal gain of 2-5 times in a wide scanning mode. Furthermore, when there is a high collision pressure in the ion optical device (for example greater than 5 Pa), the mass to charge ratio of the ion optical device is then controlled by the ion mobility that is controlled by a migration electric field and the collision gas. At this time, a set control voltage of the following-stage quadrupole mass analyzer 200 shall be matched with the mass to charge ratio of the ions whose mobility is to be measured.

Figure 3:
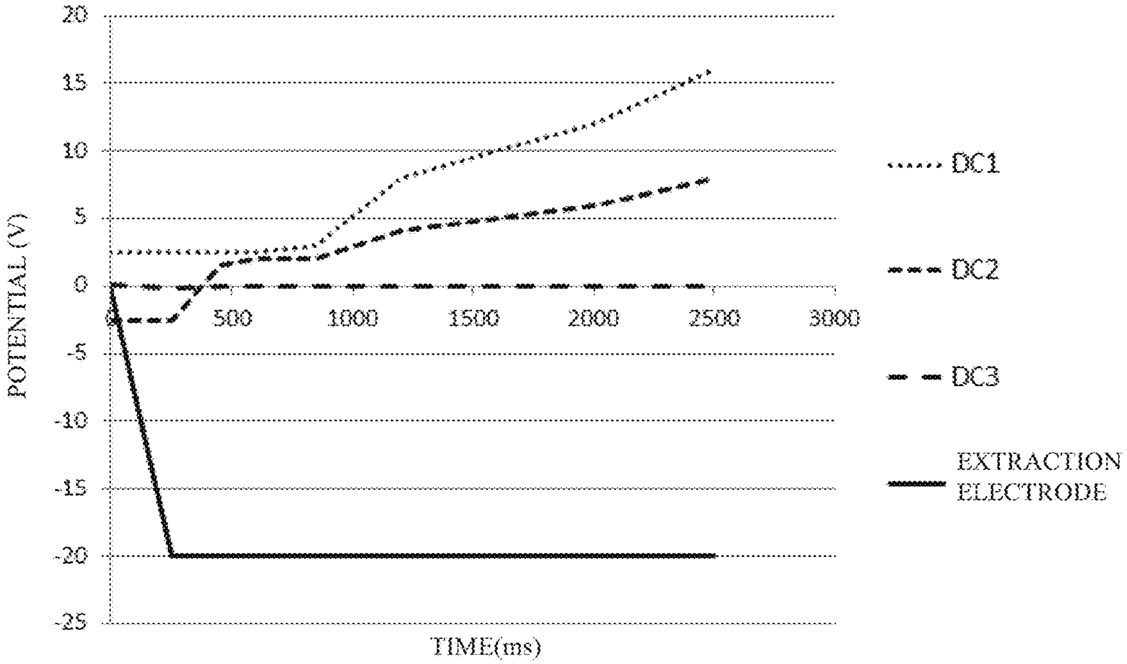
FIG. 3 shows a time sequence of the embodiment shown in FIGS. 2*a* to 2*f*.
Figure 4:
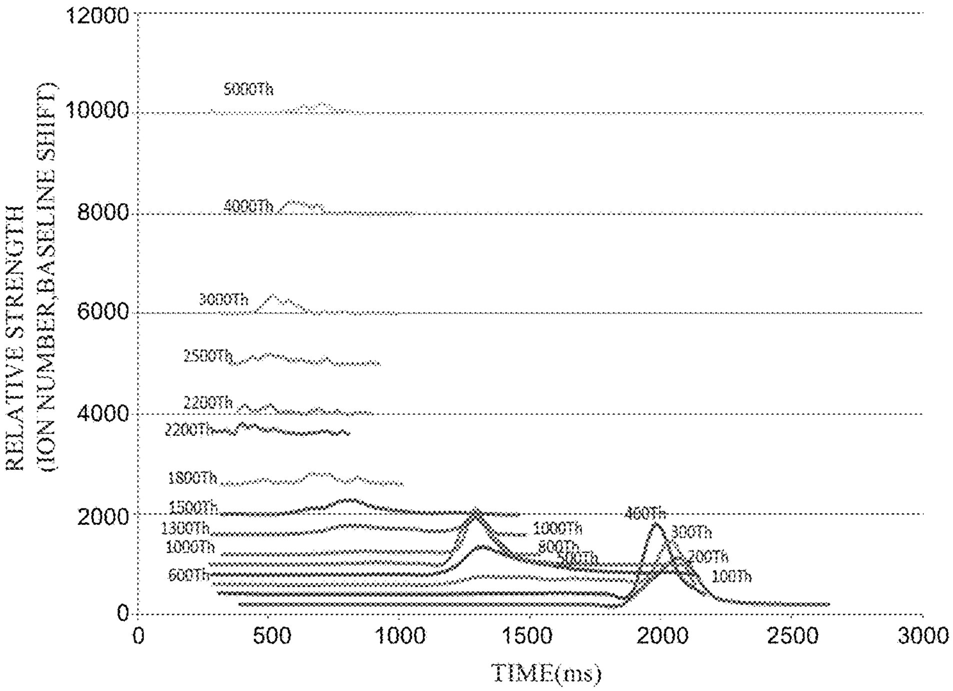
FIG. 4 shows a superposition diagram of overflow curves of all ions each having different mass to charge ratios obtained through ion optical simulation under the condition of the time sequence in FIG. 3.

By changing voltages affecting the barrier height, in particular by adjusting its change speed, certain ions may be polymerized in close time segments, while ions whose mass range is several times this range may be extracted at a next time segment. Such characteristics are of great importance to the extension of a mass-to-charge ratio dynamic range of the time of flight mass spectrometer. FIG. 3 shows a typical operating time sequence for changing the potential barrier. In the preparation stage, a high potential is applied to the extraction electrode 110, and no ion may pass through the ion optical device at this time. At around 250 microseconds, the voltage drops accompanied with potential modification occurring to DC1-DC3. Ions within a mass to charge range of 5000 Th-1500 Th will subsequently be ejected in about 250 microseconds. A scanning slop of DC1-DC3 also changes at 1000 and 2000 microseconds, such that ions within ranges of 1500-400 Th and 400-100 Th are ejected in segments. Each batch of ions ejected may roughly fall within a length range of a pulse repulsion area extracted by one pulse at the same time since ions manipulated to be extracted have a low-high mass window of only about 3 times in each segment, such that all ions may be detected and used, thus mass range constraint issues occurring in orthogonal time of flight mass spectrum resulting from a limited repulsion area length is avoided. FIG. 4 shows a superposition diagram of overflow curves of all ions each having different mass to charge ratios obtained through ion optical simulation under the condition of the time sequence in FIG. 3. As can be seen, ions in windows of different mass to charge ratios are indeed well distributed in corresponding time windows of about 250 microseconds.

Figure 5A:
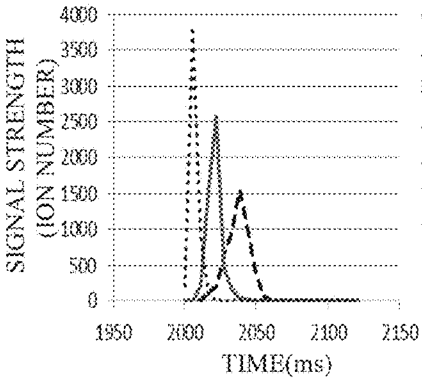
FIGS. 5*a* to 5*c* show an effect diagram of a test performed in the embodiment of FIGS. 2*a* to 2*f*, showing influences of a variation rate of a barrier potential DC1 changing from 14V/ms to 1.5V/ms on ion separation.
Figure 5B:
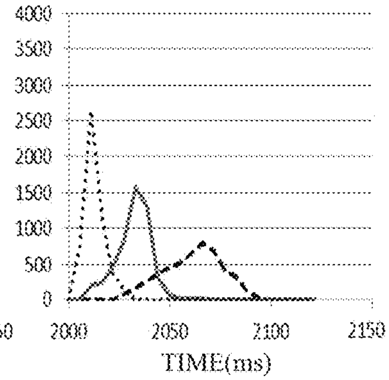
Figure 5C:
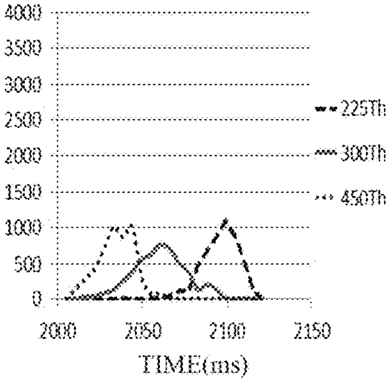
Figure 6A:
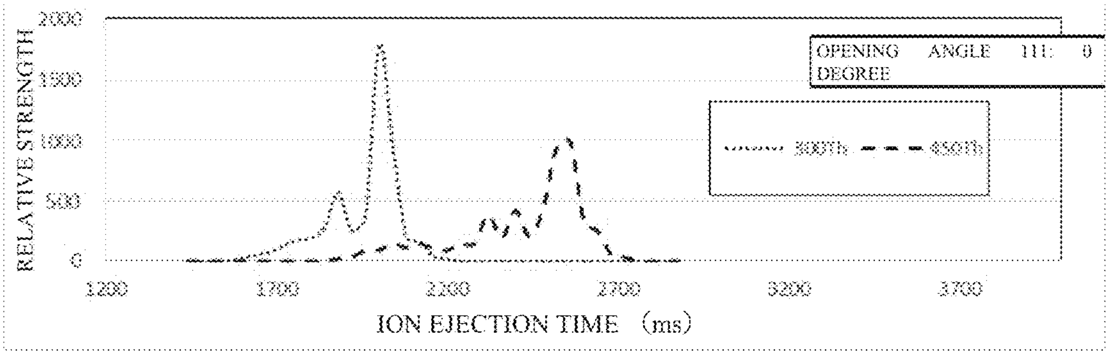
FIGS. 6*a* to 6*g* show a distribution diagram of ejection times at which ions with a mass number of 300 Th and 450 Th are ejected from the ion manipulation device in the case that an opening angle between confinement electrode units of the ion optical device of the present invention is 0-50 degrees.
Figure 6B:
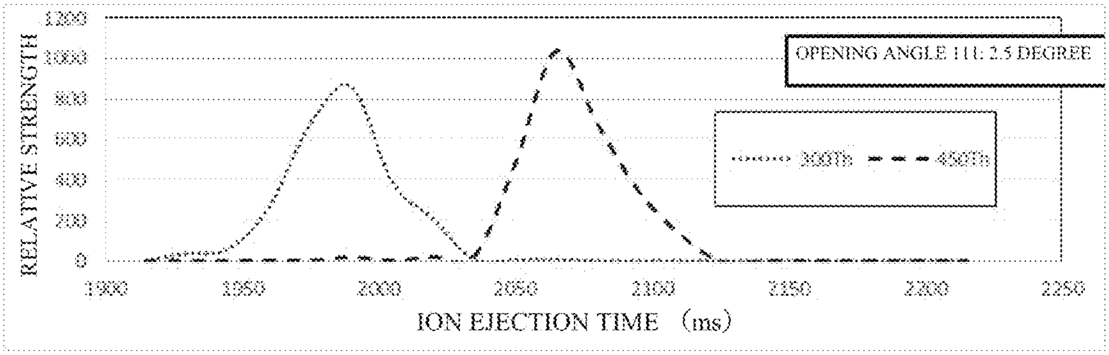
Figure 6C:
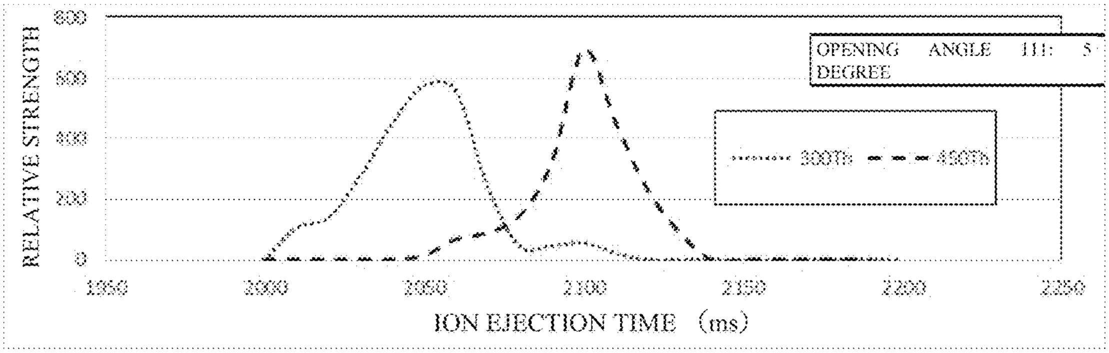
Figure 6D:
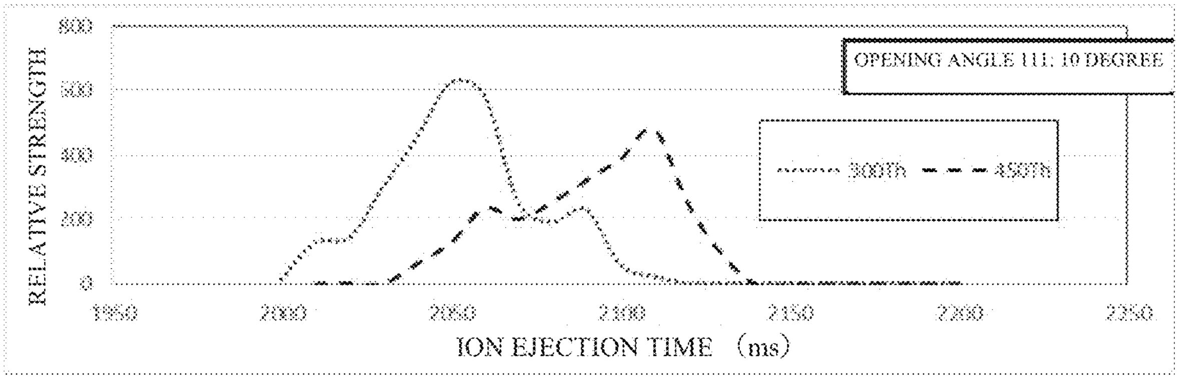
Figure 6E:
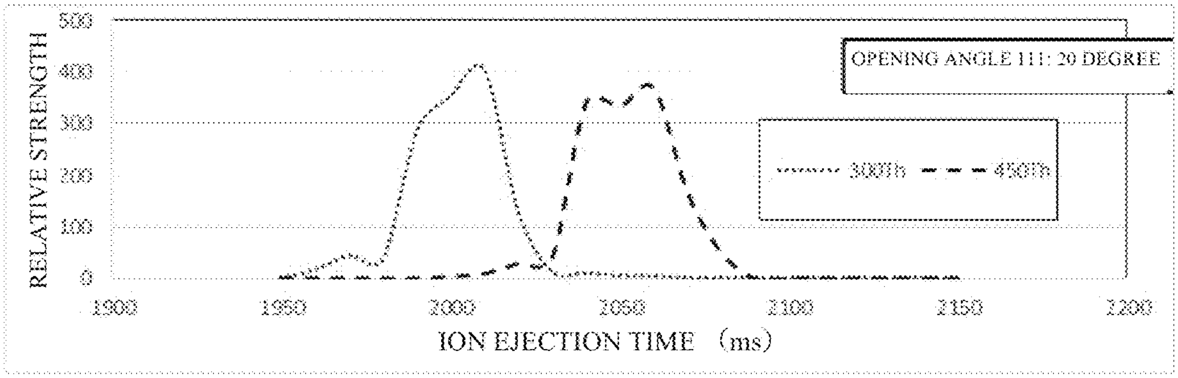
Figure 6F:
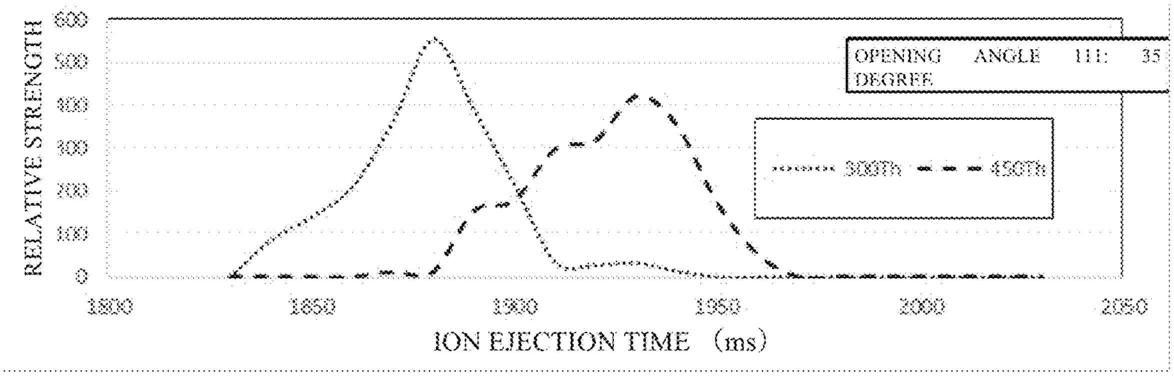
Figure 6G:
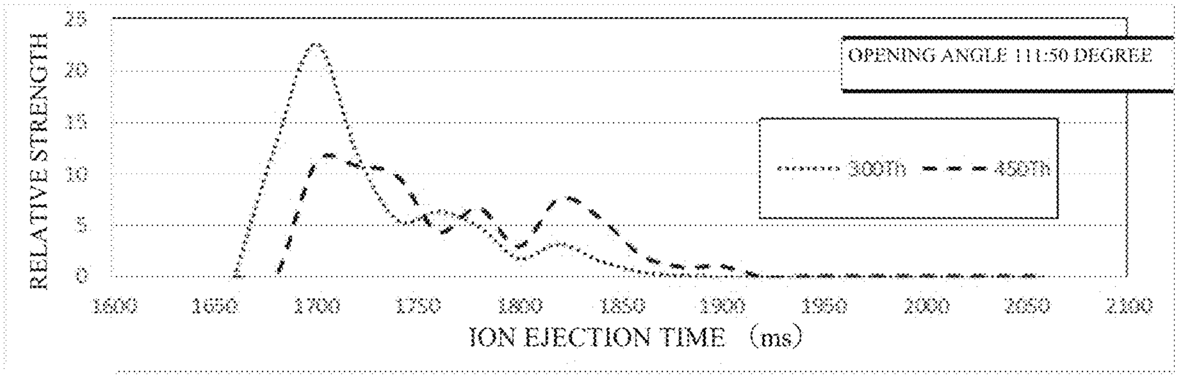

When a height variation speed of potential barriers or potential wells formed in the device changes, the mass to charge ratio separation effect may be further improved. FIGS. 5*a* to 5*c* show cases in which a variation rate of the outer side barrier potential DC1 changes from 14V/millisecond to 1.5V/millisecond. Under original conditions of 14V/millisecond, ions with a mass number of 225 and 450 may not be separated at bottom, but with the decrease in scanning speed, the ions of two mass to charge ratios begin to separate and are completely separated when the scanning speed reaches 1.5V/millisecond. For small time of flight mass spectrometers pursuing the sensitivity, the low-high mass window of 3 times cannot ensure that the ions fall within the time of flight repulsion area at the same time due to the limitations on structure size. However, with the decrease in scanning speed, separation of a low-high mass window of about 1.5 times may be realized, thus such small instruments may also obtain better full mass sensitivity performances.

It should be noted that the ion optical device depends on the ion potential barrier in the second direction orthogonal to the first direction to distinguish ions, so that keeping the potential barrier constant in a possible ion transition region is very important for the improvement of performances of the ion optical device to distinguish ions of different mass numbers. As for the distinguishing potential barriers at different axial positions, the heights in the second orthogonal direction may change at different axial positions due to the field penetration of the end extraction electrode 110, etc., in the axial direction, thereby affecting the separation efficiency of different ions.

Figure 7:
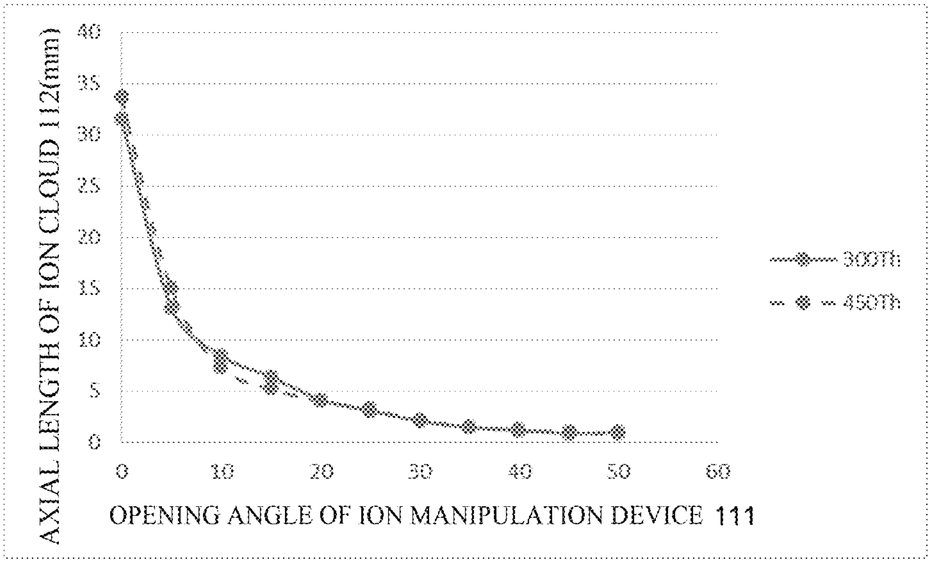
FIG. 7 shows an axial distribution length of the ions of 300 Th and 450 Th after a long storage time in the case that the opening angle in FIGS. 6*a* to 6*g* varies.

To solve this problem, as shown in FIG. 1*a*, angled openings may be formed between the pairs of confinement electrode units. Referring to FIGS. 6*a* to 6*g*, which correspond to computer trajectory analyses made on ion separation effects of the ion optical device when the opening angle is 0, 2.5, 5, 10, 20, 35 and 50 degrees, respectively. Resolving effects on ions with a mass number of 300 Th and 450 Th are shown in the above Figures. As can be seen, as long as the ion optical device has an inlet opening angle greater than 0 degree, its ion separation ability will be improved. By analyzing an ion distribution length in the axial direction after the ions are introduced into the optical device for a long time (for example, more than 100 ms), as shown in FIG. 7, it is found that the presence of the opening angle also allows a pseudo potential field to be formed in the ion optical device along the axial direction. Besides, due to an accompanying DC penetration field when a voltage is set for the radial potential barrier, a distribution distance 112 of the ions in the axial direction becomes shorter, such that when different ions transit the potential barriers used for ion separation, potential barrier variations caused at different axial positions are somewhat further suppressed due to the fact that axial positions where transition may occur becomes less diversified, thereby improving the resolving effects. Furthermore, the DC penetration field may facilitate a smooth transport of the ions in the axial direction, reduce a residence time of the ions in the device, reduce unnecessary molecule-ion reactions and reduce the negative effects produced by space charge distribution.

Figure 8:
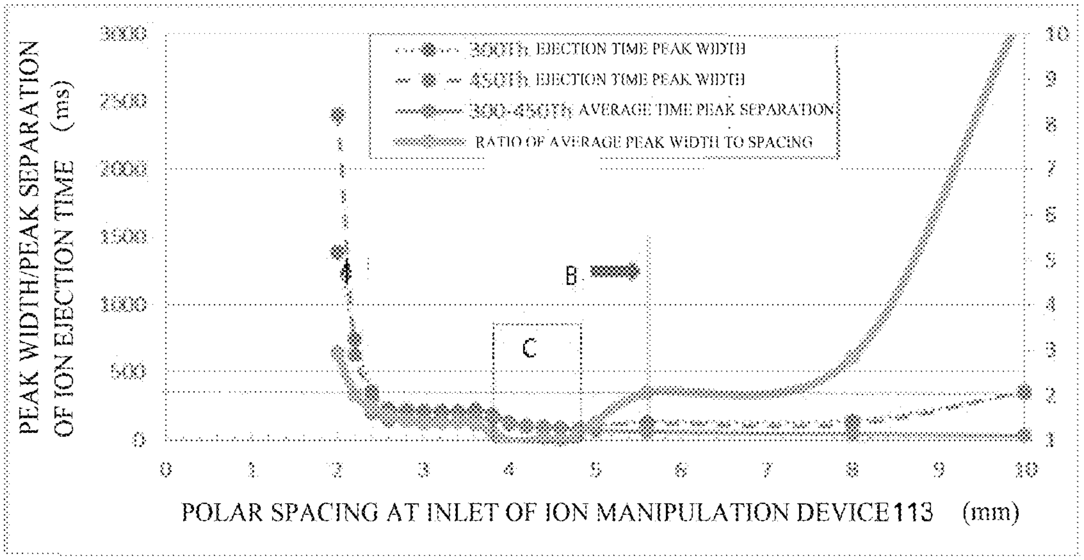
FIG. 8 shows the effects of changing a polar spacing at an inlet on the ejection time distribution of the ions of 300 Th and 450 Th when the polar spacing at an outlet of the ion optical device of the present invention is 2 mm.

It should be noted that the opening angle is not the larger the better. When the opening angle is greater than 35 degrees, a rapid decrease in a polar spacing (also referred to as field radius) may cause the ions to experience an excessively strong radio-frequency potential barrier at an axial end. Although the ions may be almost compressed into a point space smaller than 1 mm, they are unable to pass through the end extraction electrode 110 in the form of a focused ion beam, but are consumed in band-shaped confinement electrodes due to an accompanying strong quadrupole DC deflecting field. When the opening angle is less than 35 degrees, although the ions can exit the ion optical device through the extraction electrode 110, barrier height variations at different axial positions are very severe, and therefore the resolution of ions may also be disrupted severely. For this, as shown in FIG. 1*b*, it is necessary to control a variation proportion of the polar spacing 113 (that is, a spacing between the paired confinement electrode units 11 and 12 in this embodiment) in the whole axial length so as to control the variation amplitude of the barrier heights along the axial direction. In case the spacing between the confinement electrodes at the axial end (adjacent to the ion outlet) is 2 mm, the effects exhibited by the spacing between the paired confinement electrode units 11 and 12 arranged adjacent to the ion inlet 100 on time resolution of ions of 300 Th and 450 Th are shown in FIG. 8. A difference ratio between an ejection time distribution width and an average ejection time of the two types of ions may be controlled to be around 0.95 at most, which corresponds to an almost complete separation at bottom peak widths of the two types of ions. In this case, the corresponding polar spacing 113 at the inlet is 4 to 4.8 mm (corresponding to C in FIG. 8, representing better resolution conditions), and a corresponding opening ratio between the paired confinement electrode units 11 and 12 at two ends in the first direction is 2 to 2.4. When the polar spacing 113 at the inlet is less than 5.6 mm (corresponding to B in FIG. 8, representing a substantial possession of an upper limit of mass resolution conditions), the difference ratio between a half-height peak width and the average ejection time of the two types of ions may be controlled below 1, which means that the ion optical device has actual mass distinguishing effects on the two types of ions, with the corresponding opening ratio of the two ends being within the range of 1 to 2.8.

It should also be noted that for a modern time of flight system of high pulse repetition rate, the ions ejected may be further adjusted by applying additional pulse voltages on the extraction electrode 110 through the controller 300. For example, in the above device, when a −30V/−10V square wave with a duty cycle of 30% and a frequency of 50 KHz is applied to the potential of the extraction electrode (Skimmer), poor conditions for the polar spacing at the inlet may be improved. For example, ion clusters with an original width of 220 microseconds between the electrodes at the inlet may be compressed into a plurality of short pulse clusters each having a width of about 20 microseconds. For each specific extraction time, since the mass to charge ratio range of the ions ejected is highly confirmable, it is possible to obtain a repulsion pulse delay time of the time of flight mass analyzer through a predicted average dynamic mass variation of the extracted ions, such that time of flight instruments ranging from high speed to a repetitive pulse rate of 50 KHz may make full use of ions of various mass to charge ratios in the future. For an existing time of flight system of 10 KHz, such modulations may allow ions with a 1.5-fold mass to charge ratio range to be adjusted into pulses with a width of about 30 microseconds instead of bottom separation, and mass distinguishing-synchronous mass analysis and detection may also be achieved quite well.

Figure 9A:
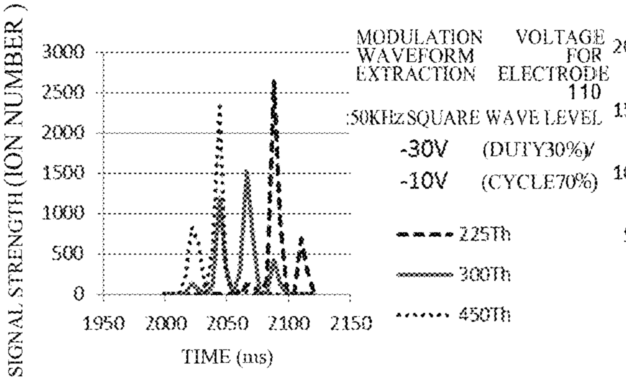
FIGS. 9*a* and 9*b* show an effect diagram of the ejected ions being compressed into a plurality of short pulse clusters when different voltages are applied to an extraction electrode; and an effect diagram of the mass to charge ratio of ions within each short cluster being controlled within a desired range.
Figure 9B:
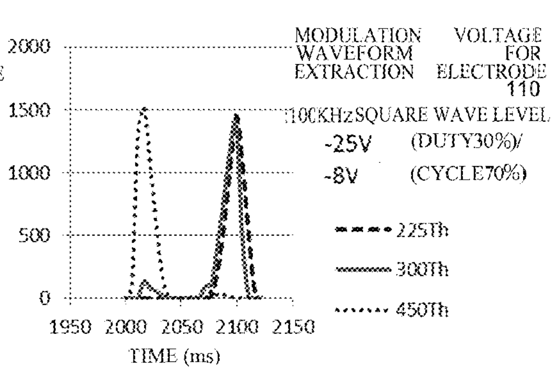

In particular, as shown in FIGS. 9*a* and 9*b*, FIG. 9*a* shows an effect diagram of the ejected ions being compressed into a plurality of short clusters when a −30V/−10V voltage with a duty cycle of 30% and a frequency of 50 KHz is additionally applied to the extraction electrode 110 of the ion manipulation device. Ions of 225 Th, 300 Th and 450 Th are taken as an example. FIG. 9*b* shows an effect diagram of a −25 V/8 V voltage with a duty cycle of 30% and a frequency of 10 KHZ being applied to the extraction electrode to allow the mass to charge ratio range of ions within each of these adjacent short clusters to be controlled within the range of 1.5 times the mass to charge ratio range as ions of the same intermediate mass to charge ratio are separated into two adjacent clusters.

The above embodiments illustrate the principle and functions of the present invention through examples simply and are not intended to limit the present invention. Those familiar with the technology may make modifications or changes to the above embodiments without departing from the spirit and scope of the present invention. Thus, all equivalent modifications or changes accomplished by the ordinary staff in this technical field without departing from the spirit and technical idea disclosed in the present invention are intended to be covered by the claims appended below.

What is claimed is:

1. An ion optical device, comprising:

an ion inlet positioned upstream of a first direction for introducing ions along the first direction;

an outlet positioned downstream of the first direction for ejecting the ions out of the ion optical device;

one or more pairs of confinement electrode units arranged opposite to each other at two sides of the first direction in a space, wherein each confinement electrode has a straight band shape and extends from the ion inlet to the outlet along the first direction such that the one or more pairs of the confinement electrode units define an opening angle between the paired confinement electrode units for introducing a DC penetration field in the first direction and for compressing and transporting ions downstream in the first direction, wherein the opening angle is greater than 0 and less than 50 degrees;

a power supply device for applying opposite radio-frequency voltages to the pairs of confinement electrode units respectively and forming on the confinement electrode units a plurality of DC potentials which are distributed in a second direction substantially orthogonal to the first direction so as to form a potential barrier in the second direction over at least a portion of the length of the first direction;

at least one first area and at least one second area positioned in the space at two sides of the potential barrier in the second direction; and a control device connected with the power supply device for controlling an output of the power supply device to change the potential barrier so as to manipulate the ions transported or stored in the first area to be transferred to the second area through the potential barrier in different ways based on the mass to charge ratio or mobility of the ions and continue to be transported along the first direction.

2. The ion optical device according to claim 1, characterized in that the control device is used for manipulating an output amplitude or frequency of the power supply device to adjust the position, height or gradient direction of the potential barrier.

3. The ion optical device according to claim 1, characterized in that ions in the second area are to be ejected from the ion optical device along the first direction.

4. The ion optical device according to claim 3, further comprising: an extraction electrode unit arranged downstream of the second area and connected with the outlet of the ion optical device for ejecting the ions in the second area out of the ion optical device.

5. The ion optical device according to claim 4, characterized in that a periodic pulse voltage used for effecting ejection of the ions is applied to the extraction electrode unit.

6. The ion optical device according to claim 3, characterized in that a following stage of the ion optical device is provided with a mass analyzer to which the control device is connected; and the control device is used to control the power supply device and the mass analyzer such that the mass to charge ratio or mobility of the ions transferred to the second area for ejection matches with an ion mass needing analysis that is set by the control device for the mass analyzer.

7. The ion optical device according to claim 1, characterized in that each confinement electrode unit comprises a plurality of electrodes arranged along the second direction, and radio-frequency voltages of opposite phases and DC voltages are applied to adjacent electrodes; and the electrodes of two paired confinement electrode units form one-to-one pairs, and radio-frequency voltages of opposite phases are applied to two paired electrodes, respectively.

8. The ion optical device according to claim 7, characterized in that the electrodes of each confinement electrode unit are spaced apart in parallel.

9. The ion optical device according to claim 7, characterized in that each confinement electrode unit comprises more than 3 electrodes.

10. The ion optical device according to claim 1, characterized in that there is a collision gas in the space.

11. The ion optical device according to claim 10, characterized in that the collision gas has a pressure ranging from 0.1 to 10 Pa.

12. The ion optical device according to claim 1, characterized in that an opening angle greater than 0 and less than or equal to 20 degrees is formed between the paired confinement electrode units.

13. The ion optical device according to claim 1, characterized in that a ratio of opening distances between the paired confinement electrode units at two ends in the first direction is 1 to 2.8.

14. The optical device according to claim 1, characterized in that a ratio of opening distances between the paired confinement electrode units at two ends in the first direction is 1.9 to 2.4.

* * * * *